United States Patent
Siegel et al.

(10) Patent No.: US 6,394,770 B1
(45) Date of Patent: May 28, 2002

(54) PISTON PUMP

(75) Inventors: Heinz Siegel, Stuttgart; Werner-Karl Marquardt, Markgroeningen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,149

(22) PCT Filed: Nov. 26, 1999

(86) PCT No.: PCT/DE99/03750

§ 371 (c)(1), (2), (4) Date: Mar. 26, 2001

(87) PCT Pub. No.: WO00/58627

PCT Pub. Date: Oct. 5, 2000

(30) Foreign Application Priority Data

Mar. 27, 1999 (DE) .......................... 199 14 065

(51) Int. Cl.⁷ ........................... F04B 19/00; F04B 37/00

(52) U.S. Cl. .................. 417/470; 137/514; 137/543.13; 417/554

(58) Field of Search ................................. 417/470, 557, 417/558, 549, 554; 137/514, 539.5, 543.13

(56) References Cited

U.S. PATENT DOCUMENTS

| | | | | |
|---|---|---|---|---|
| 5,984,651 A | * | 11/1999 | Beck et al. ................... | 417/503 |
| 6,142,037 A | * | 11/2000 | Bostosan et al. ......... | 74/606 R |
| 6,171,083 B1 | * | 1/2001 | Schuller et al. ............. | 417/549 |
| 6,334,762 B1 | * | 1/2002 | Hauser et al. .............. | 417/569 |

FOREIGN PATENT DOCUMENTS

DE  004425402 A1  *  4/1996

* cited by examiner

Primary Examiner—Charles G. Freay
Assistant Examiner—Han L Liu
(74) Attorney, Agent, or Firm—Ronald E. Greigg

(57) ABSTRACT

The invention relates to a piston pump for a vehicle brake system, in particular an electrohydraulic vehicle brake system. To improve the aspiration performance of the piston pump when the brake fluid is viscous at low the invention proposes a valve opening device, which compulsorily opens the inlet valve, embodied as a spring-loaded check valve, of the piston pump at the onset of a return stroke of the piston. The valve opening device has an opener pin, which is mounted on a valve ball of the inlet valve, and which at the end of a supply stroke of the piston enters a perforated, disklike valve opener part. At the onset of the return stroke, the valve opener part restrains the valve ball by frictional force at its opener pin and thereby opens the inlet valve.

10 Claims, 3 Drawing Sheets

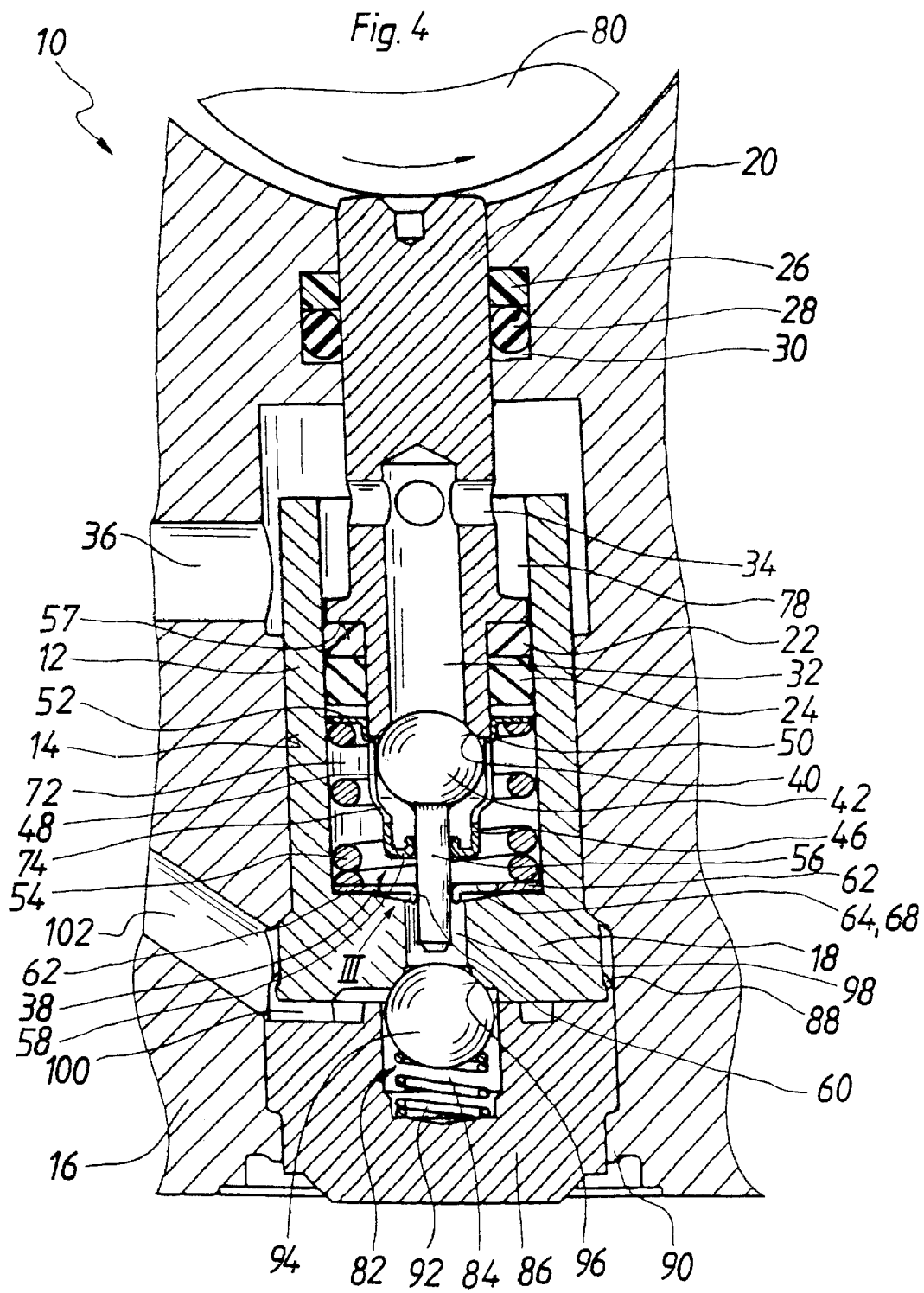

PISTON PUMP

CROSS-REFERENCE TO RELATED APPLICATIONS

This application is a USC 371 application of PCT/DE 99/03750 filed on Nov. 26, 1999.

PRIOR ART

The invention relates to a piston pump which is intended in particular for use in an electrohydraulic vehicle brake system, where it serves the purpose of brake pressure buildup. It can also be used in some other, in particular a slip-controlled, vehicle brake system.

One such piston pump is known from German Patent Disclosure DE 44 25 402 A1. The known piston pump has a pump housing, in which a piston is guided axially displaceably. The piston can be guided either directly in the pump housing or in a bush inserted into the pump housing. For driving the piston, the known piston pump has an eccentric element, which can be driven to rotate by an electric motor and which drives the piston to a stroke motion that reciprocates in the axial direction. The stroke motion includes a supply stroke, in which a volume of a positive displacement chamber of the piston pump is reduced in size and fluid to be pumped is positively displaced out of the piston pump, and a return stroke, in which fluid flows into the positive displacement chamber. A turning point of the piston at the end of the supply stroke and the beginning of the return stroke will, for the purposes of the present invention, be called top dead center. In a manner known per se, the stroke motion of the piston brings about pumping of fluid that is to be pumped.

For controlling a fluid flow, the known piston pump has an inlet valve, embodied as a spring-loaded check valve, whose valve closing spring is braced in stationary fashion in the pump housing and presses a valve closing body of the inlet valve against a valve seat embodied on one face end of the piston. Because of the stationary bracing of the valve closing spring in the pump housing, the length of the valve closing spring changes during the piston stroke. The change in length of the valve closing spring causes a change in a spring force exerted on the valve closing body by the valve closing spring. This spring force, which presses the valve closing body against the valve seat, is the greatest at the end of the supply stroke and at the beginning of the return stroke, or in other words at top dead center, and therefore precisely whenever the inlet valve is supposed to open at the beginning of the return stroke of the piston.

To improve an opening performance of the inlet valve in the known piston pump, its valve closing body is provided with a pin, which is in frictional engagement with a bush mounted in stationary fashion in the pump housing. The frictional force exerted on the valve closing body is always oriented counter to a motion; at the beginning of the return stroke of the piston, this force acts on the valve closing body in an opening direction. As a result, the frictional force reinforces the opening of the inlet valve at the onset of the return stroke. The frictional force exerted on the valve closing body is selected such that it is less than a minimum spring force of the valve closing spring at maximum length of the valve closing spring, or in other words at bottom dead center of the piston, so that at bottom dead center the inlet valve will be closed by the valve closing spring. As a result of this limitation of the frictional force, its effect that reinforces the opening of the inlet valve is limited, since at top dead center of the piston, or in other words precisely when the inlet valve is supposed to open, the spring force of the valve closing spring is greatest. Compulsory opening of the inlet valve by the frictional force exerted on its valve closing body by the bush, which is stationary in the pump housing, fails to occur.

For opening the inlet valve in the known piston pump, a pressure difference must prevail at the valve closing body of the inlet valve, and this difference, reinforced by the frictional force exerted on the valve closing body, lifts the valve closing body from the valve seat, counter to the spring force of the valve closing spring which is at maximum at top dead center. This pressure difference is brought about during the return piston stroke, which reduces the volume of the positive displacement chamber of the piston pump in the supply stroke and increases it in the return stroke. A disadvantage is that to effect the pressure difference at the inlet valve required for opening the inlet valve, the piston must travel some distance from top dead center in the return stroke direction. Especially at low temperatures, below freezing, the piston travel required to open the inlet valve is lengthened because of the increasing viscosity of the fluid to be pumped, which for instance is a brake fluid. The delay in opening the inlet valve is amplified still more by outgassing effects, which speed up at low temperatures. The outgassing effects cause an increase in the volume of the fluid in the positive displacement chamber of the piston pump, when the volume of the positive displacement chamber increases in the return stroke of the piston. Because of the increase in volume of the fluid caused by the outgassing effects, the buildup of the pressure difference at the inlet valve in the return stroke of the piston is slower, and the distance traveled by the piston until the inlet valve opens is lengthened. The result is an impairment of the pumping capacity of the piston pump.

ADVANTAGES OF THE INVENTION

The piston pump according to the invention has a valve opening device which compulsorily opens the inlet valve at the beginning of the return stroke of the piston. The inlet valve of the piston pump of the invention is opened independently of a pressure difference applied to it and also counter to the force of any valve closing spring that may be present. As a result, from the onset of the return stroke of the piston, fluid to be pumped flows into the positive displacement chamber of the piston pump, and especially at low temperatures as well, the entire return stroke of the piston is available and is used for the inflow of the fluid to be pumped into the positive displacement chamber. The piston pump of the invention has the advantage of an improved pumping capacity and enhanced efficiency, especially at low temperatures.

The piston pump of the invention furthermore has a valve stroke limiter, which limits an opening stroke of a valve closing body of the inlet valve. During the return stroke of the piston, the valve stroke limiter acts as a slaving means for the valve closing body of the inlet valve, which body slaves the valve closing body to the piston in the return stroke of the piston in the fully open position. This has the advantage that a valve closing time at the end of the return stroke is short.

To improve a closing performance of the inlet valve, the piston pump in one embodiment of the invention has a valve closing spring for the inlet valve. This spring is preferably mounted on the piston, so that the spring force of the valve closing spring is independent of a piston position.

According to one feature of the invention it is provided that the inlet valve mounted on the piston, before reaching top dead center, enters at the end of the supply stroke of the piston into a force-releasable engagement with the valve opening device, which is mounted in stationary fashion in the pump housing. The force-releasable engagement can also exist with a part of the valve opening device that is stationary in the pump housing, while conversely another part of the valve opening device, which enters into engagement with the stationary part, is connected to the valve closing body and is slaved to it. The force-releasable engagement is nonpositive or frictional and/or positive. After top dead center has been overcome, the valve opening device of the valve closing body restrains the inlet valve and thereby opens the inlet valve. The engagement force exerted on the valve closing body by the valve opening device is so great that it opens the inlet valve even counter to the force of any valve closing spring of the inlet valve that may be present. The valve opening device in this embodiment of the invention is operative only when the piston is located near top dead center, or in other words at the end of the supply stroke and the beginning of the return stroke.

After the opening of the inlet valve, the valve stroke limiter puts the valve closing body of the inlet valve out of engagement with the valve opening device by means of the return stroke motion of the piston, so that the inlet valve acts like a conventional check valve and closes automatically at the end of the return stroke.

According to another feature of the invention, the valve closing body of the inlet valve remains in frictional engagement with the valve opening device during the entire piston motion. As a result, the inlet valve is opened compulsorily at the beginning of the piston return stroke and kept open during the return stroke. At the beginning of the supply stroke, the inlet valve is closed again by the valve opening device and is kept closed during the supply stroke.

The piston of the piston pump of the invention is preferably embodied as a stepped piston. The stepped piston is guided, on its end toward the positive displacement chamber, over a larger diameter than on its end remote from the positive displacement chamber. This creates an annular chamber, which surrounds the piston on its smaller diameter and whose volume increases in the supply stroke of the piston and decreases in the return stroke. The increase in size of the annular chamber in the supply stroke causes an aspiration of fluid to be pumped. In the return stroke, while the volume of the annular chamber is indeed decreased, nevertheless the volume of the positive displacement chamber of the piston pump increases to a greater extent, so that fluid to be pumped overflows from the annular chamber into the positive displacement chamber. The use of a stepped piston in the piston pump of the invention has the advantage that by means of the inlet valve that opens compulsorily at the beginning of the return stroke, fluid to be pumped overflows from the annular chamber into the positive displacement chamber, and the overflow is reinforced by inertia on the part of fluid aspirated into the annular chamber during the supply stroke and accelerated in the process. If the inlet valve is not compulsorily opened, then the inlet valve at the beginning of the return stroke of the piston causes a counterpressure on an inflow side of the inlet valve, which brakes the fluid to be pumped, which is accelerated during the supply stroke in the inlet of the piston pump, and counteracts an overflow of fluid, aspirated into the annular chamber during the supply stroke, into the positive displacement chamber of the piston pump.

The piston pump according to the invention is intended in particular as a pump in a brake system of a vehicle and is used in controlling the pressure in wheel brake cylinders. Depending on the type of brake system, the abbreviations ABS (anti-lock brake system), TCS (traction control system), ESP (electronic stability program) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or ESP or EHB). For instance, the pump is needed in a brake system with wheel slip control (ABS or TCS) and/or a brake system serving as a steering aid (ESP) and/or an electrohydraulic brake system (EHB). With wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (ESP), a brake pressure is built up in one or more wheel brake cylinders independently of an actuation of the brake pedal or gas pedal, for instance to prevent the vehicle from breaking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF THE DRAWINGS

The invention will be described in further detail below in terms of a preferably selected exemplary embodiment shown in the drawing. Shown are FIG. 1, an axial section through a piston pump according to the invention;

FIG. 4, an axial section of a further version of a piston pump according to the invention.

DESCRIPTION OF THE EXEMPLARY EMBODIMENTS

Figure 1:
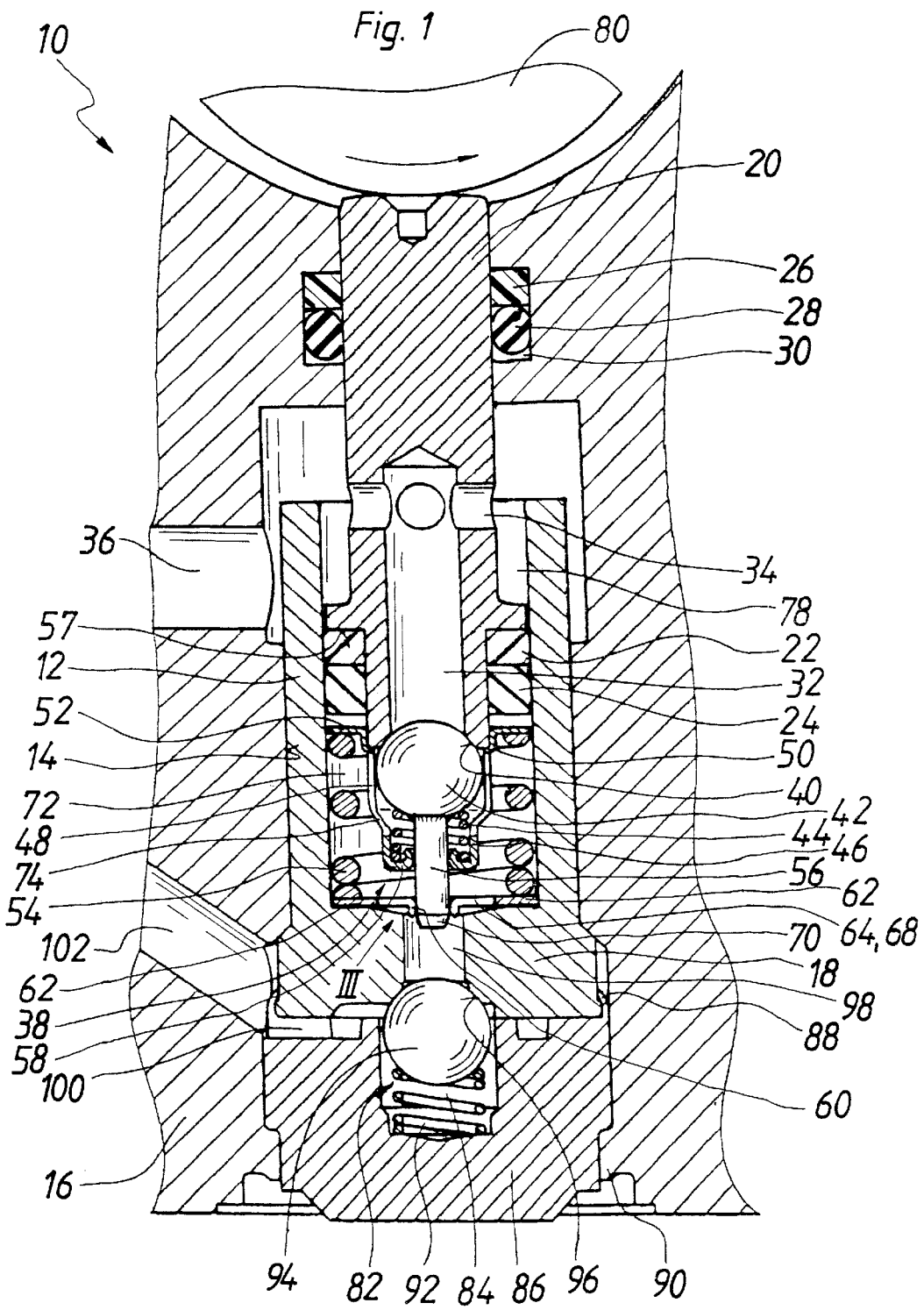

The piston pump according to the invention shown in FIG. 1 and identified overall by reference numeral 10 has a bush 12, which is inserted into a stepped pump bore 14 of a hydraulic block that forms a pump housing 16. The bush 12 has a bush bottom 18 integral with it. The hydraulic block, of which for the sake of clarity only a fraction surrounding the piston pump 10 is shown in the drawing, is part of an electrohydraulic or slip-controlled vehicle brake system, not otherwise shown. Inserted into it and hydraulically connected with one another besides the piston pump 10 are other hydraulic components, not shown, such as magnet valves and hydraulic reservoirs. Wheel brake cylinders, not shown, are connected to the hydraulic block.

A boltlike piston 20 is received in the bush 12 over approximately half the length of the piston, an end of the piston 20 located in the bush 12 is guided axially displaceably with a guide ring 22 on the inside surface of the bush 12 and sealed off with a sealing ring 24. An end of the piston 20 protruding from the bush 12 is guided with a guide ring 26 in the pump bore 14 and sealed off with a sealing ring 28, both rings resting in a groove 30 in the pump housing 16.

The piston 20 is embodied as a stepped piston; that is, in the bush 12, it is guided and sealed off over a larger diameter than on its end protruding out of the bush 12.

For admitting fluid, the piston 20 is provided with an axial blind bore 32 from extending inward from its end located in the bush 12; near its bottom, this bore is intersected by transverse bores 34. A rated diameter of the piston 20 corresponds to an inside diameter of the bush 12, and there is a clearance fit between the piston 20 and bush 12; that is, with regard to the bush 12, the piston 20 has an undersize, which assures the axial displaceability of the piston 20. The blind bore 32 and the transverse bores 34 communicate with an inlet bore 36, which discharges into the pump bore 14 radially to the piston pump 12.

As an inlet valve 38, the piston pump 10 of the invention has a spring-loaded check valve, which is mounted on the end of the piston 20 located in the bush 12: An orifice of the blind bore 32 is embodied as a conical valve seat 40, against which a valve ball 42, as a valve closing body, is pressed by a helical compression spring, acting as a valve closing spring 44. The valve closing spring 44 is braced against a bottom of a cup-shaped valve cage 46, which is made as a deep-drawn sheet-metal part and has openings 48. On its open side, the valve cage 46 has an encompassing annular shoulder 50, with which it rests on the face end, located in the bush 12, of the piston 20, as well as a radial flange 52, at which it is pressed against the face end of the piston 20 by a piston restoring spring 54. The valve ball 42 and the valve closing spring 44 are received in the valve cage 46. The piston restoring spring 54, which is braced against the bush bottom 18, is embodied as stronger than the valve closing spring 44, so that under all the loads incident in the operation of the piston pump 10, it securely keeps the valve cage 46 on the face end of the piston 20.

The guide ring 22 and sealing ring 24 that are located in the bush 12 are fixed on the piston 20 in the axial direction between the radial flange 52 of the valve cage 46 and an annular shoulder 57 of the piston 20. A spacing of the annular shoulder 57 from the radial flange 52 is dimensioned such that the guide ring 22 and sealing ring 24 are not buckled.

The drive of the piston 20 to execute a stroke motion reciprocating in the axial direction is effected by means of an eccentric element 80, which can be driven to rotate by an electric motor, not shown. The eccentric element 80 is located on the side of the piston 20 that protrudes from the bush 12; the piston 20 is pressed into contact with a circumference of the eccentric element 80 and kept there by the piston restoring spring 54.

The piston pump 10 of the invention has a valve opening device, which at the beginning of a return stroke of the piston 20 compulsorily opens the inlet valve 38 counter to the force of the valve closing spring 44, regardless of a pressure difference applied to the inlet valve 38: An opener pin 56 is mounted by welding to the valve ball 42 and is disposed axially to the piston pump 10 on a side of the valve ball 42 remote from the piston 20. The opener pin 56 penetrates a hole in a bottom 58 of the valve cage 46, and at the edge of the hole penetrated by the opener pin 56, the bottom 58 of the valve cage 46 is re-shaped into a rounded collar 60, which in the manner of a guide bush axially displaceably guides the opener pin 56 of the valve ball 42.

Figure 2:
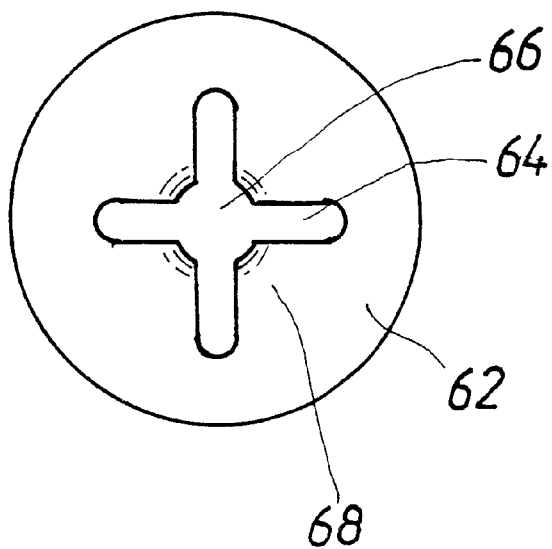
FIG. 2, an elevation view of a single part of the piston pump of FIG. 1.

The valve opener part 62 shown in FIG. 2 is placed against an inside of the bush bottom 18 and is retained on the bush bottom 18 by the piston restoring spring 54. The valve opener part 62 is a circular sheet-metal disk, which is provided with two intersecting slots 64, which in the region of intersection in the middle of the circular-disklike valve opener part 62 are widened into a hole 66. The slots 64 defines spring tabs 68 between them, whose free ends, defined by the hole 66, are bent away from the valve ball 42. The opener pin 56 is provided with a chamfer 70 on its free end.

The function of the valve opening device according to the invention is as follows: At the end of a supply stroke of the piston 20, in which the piston 20 is displaced into the bush 12, and as a result a volume of a positive displacement chamber 72 enclosed in the bush 12 by the piston 20 is decreased, the opener pin 56 enters the hole 66 in the valve opener part 62, and the chamfer 70 of the opener part 56 guides the opener pin 56 into the hole 66 of the valve opener part 62. During the supply stroke, in a manner known per se, brake fluid aspirated into the positive displacement chamber 72 is positively displaced by the piston 20 out of the positive displacement chamber 72 and thus pumped. The hole 66 in the valve opener part 62 has an undersize relative to the opener pin 56 of the valve ball 42, and the valve opener part 62 exerts a frictional force on the opener pin 56. Once the piston 20 has reached its top dead center, which within the scope of the present invention is the point at which the piston 20 is located to the greatest depth inside the bush 12, the piston 20 moves back out of the bush 12; it begins its return stroke. The frictional force between the valve opener part 62 and the opener pin 56 is greater than a spring force of the valve closing spring 44. As a result, at the beginning of the return stroke of the piston 20, the valve opener part 62 restrains the valve ball 42 at its opener pin 56, and as a result the inlet valve 38 is compulsorily opened by the return stroke motion of the piston 20. The opening of the inlet valve 38 takes place counter to the force of the valve closing spring 44 and also counter to any pressure difference, oriented counter to the opening of the inlet valve 38, that may possibly prevail at the inlet valve 38.

A valve stroke of the inlet valve 38 is limited by a valve stroke limiter 74, which is embodied as an annular shoulder that conically narrows the valve cage 46. As soon as the valve ball 42, restrained by the valve opener part 62 at the opener pin 56, of the inlet valve 38 rests on the valve stroke limiter 74 as a consequence of the return stroke of the piston 20, the valve ball 42 is slaved to the piston 20 by the valve stroke limiter 74, and as a result the opener pin 56 is pulled out of the hole 66 of the valve opener part 62. Thus the opener pin 56 comes free of the valve opener part 62 as soon as the inlet valve 38, at the beginning of the return stroke of the piston 20, has been opened by the valve opener part 62. The inlet valve 38 then acts like a conventional spring-loaded check valve; once it has been opened by the valve opener part 62, it is kept open, counter to the force of the valve closing spring 44, during the return stroke of the piston 20 by a pressure difference prevailing at the inlet valve 38, in the manner known per se in piston pumps 10.

The valve opening device according to the invention having the valve opener part 62 and the opener pin 56 has the advantage that the inlet valve 38 of the piston pump 10 is compulsorily opened at the beginning of the return stroke of the piston 20, even whenever a pressure difference is not yet operative at the inlet valve 38, or the pressure difference is too slight to open the inlet valve 38 counter to the force of the valve closing spring 44. The inflow of brake fluid into the positive displacement chamber 72 of the piston pump 10 and thus filling of the piston pump 10 are improved thereby, and the efficiency of the piston pump 10 increases. The valve opening device 56, 62 is especially advantageous with viscous, cold brake fluid, that is, at temperatures below −20° C. or −30° C., at which the viscosity of the brake fluid considerably worsens the aspiration performance of conventional piston pumps. The aspiration performance of the piston pump 10 of the invention is improved considerably, especially in pumping a viscous fluid, or in other words at low temperatures.

Figure 3:
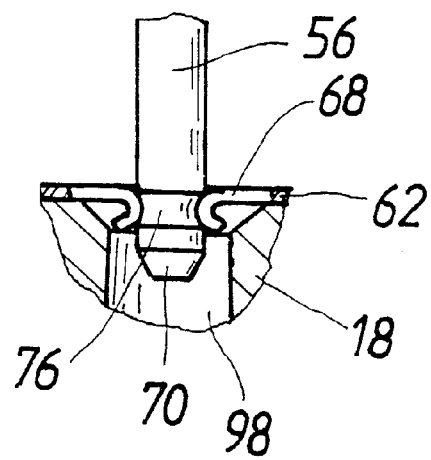
FIG. 3, a detail of a modified embodiment of the invention indicated by arrow III in FIG. 1.

FIG. 3 shows a further refinement of the piston pump 10 of the invention. In this feature of the invention, the opener pin 56 is provided with an annular groove 76 of rounded cross section, which is engaged by the spring tabs 68 of the valve opener part 62 at top dead center of the piston 20. As a result, upon opening of the inlet valve 38, the opener pin 56 is held by frictional and nonpositive engagement, until the valve stroke limiter 74, during the return stroke of the piston 20, pulls the opener pin 56 out of the valve opener 62.

Since the piston 20 is embodied as a stepped piston, an annular chamber 78 exists between the piston 20 and the bush 12. A volume of the annular chamber 78 increases during the supply stroke of the piston 20 and decreases during the return stroke. In this way, during the supply stroke of the piston 20, in which the inlet valve 38 is closed, brake fluid is aspirated out of the inlet bore 36, and the brake fluid is accelerated in the inlet region of the piston pump 10. Upon the return stroke of the piston 20, although the volume of the annular chamber 78 decreases, the volume of the positive displacement chamber 72 increases to a greater extent, so that brake fluid flows out of the blind bore 32 in the piston 20 into the positive displacement chamber 72 when the inlet valve 38 is open. The valve opening device 56, 62 of the piston pump 10 according to the invention, which opens the inlet valve 38 at the beginning of the return stroke of the piston 20, makes use of the inertia of the brake fluid, accelerated during the supply stroke, in the inlet bore 36; this reinforces the inflow of brake fluid through the transverse bores 34 and the blind bore 32 and the inlet valve 38, opened by the valve opening device 56, 62, into the positive displacement chamber 72. In a conventional spring-loaded inlet valve that is not compulsorily opened by a valve opening device, the valve ball 42 of the closed inlet valve 38, which ball is pressed against the valve seat 40 by the valve closing spring 44, would at the beginning of the return stroke slow down the brake fluid flowing in through the inlet bore 36 of the piston pump 10, thus counteracting the inflow of brake fluid into the positive displacement chamber 72.

An outlet valve 82 of the piston pump 10 is embodied as a spring-loaded check valve; it is accommodated in an axial blind bore 84 in a pluglike closure element 86; the closure element 86 closes the pump bore 14 in pressure-tight fashion. The closure element 86 is mounted on the bush bottom 18 and is connected to the bush 12 by the crimp 88. By means of an encompassing calking 90 of the pump housing 16, the closure element 86 is secured in the pump bore 14 and closes the pump bore 14 in pressure-tight fashion.

A helical compression spring is inserted as a valve closing spring 92 into the axial blind bore 84 of the closure element 86; it presses a valve ball 94 against a conical valve seat 96 mounted at an orifice of a central hole 98 that axially pierces the bush bottom 18. The valve seat 96 is shaped and hardened by swaging. An outflow of the brake fluid is effected through radial conduits 100 between the bottom 18 and the closure element 86, into an outlet bore 102 in the pump housing 16.

FIG. 4 shows a modified embodiment of the invention. To prevent repetition, the differences from FIG. 1 will be described below, and otherwise reference is made to the above descriptions. The same reference numerals are used for the same component parts.

In the piston pump 10 shown in FIG. 4, the inlet valve 38 is springless; it is embodied as a check valve as in FIG. 1, but the valve closing spring is omitted.

A further difference is that the opener pin 56 mounted on the valve ball 42 of the inlet valve 38 is longer; it engages the inside of the valve opener part 62 in every position of the piston 20. The valve opener part 62 always exerts a frictional force on the valve ball 44, and this force compulsorily opens the inlet valve 38 at the beginning of the return stroke of the piston 20 and keeps it open during the return stroke. The valve stroke limiter 74, acting as a slaving means, limits the opening stroke by the length of the valve ball 42 is lifted from the valve seat 40 and slaves the valve ball 42 to the piston 20 when the inlet valve 38 is fully open. At the beginning of the supply stroke of the piston 20, the valve opener part 62, by means of the frictional force it exerts on the valve ball 42 via the opener pin 56, closes the inlet valve 38. The distance in the direction of the return stroke traversed by the piston 20 to close the inlet valve is thus limited to the opening stroke of the inlet valve 38 that is predetermined by the valve stroke limiter 74.

The foregoing relates to preferred exemplary embodiments of the invention, it being understood that other variants and embodiments thereof are possible within the spirts and scope of the invention, the latter being defined by the appended claims.

We claim:

1. A piston pump (10), having a piston (20) which is axially displaceably received in a pump housing (16) and which can be driven to execute a reciprocating stroke motion that includes a supply stroke and a return stroke, and having an inlet check valve (38) which is mounted on the piston (20), wherein the piston pump (10) has a valve opening device (56, 62), which opens the inlet check valve (38) at the onset of the return stroke of the piston (20), and that the inlet check valve (38) has a valve closing body (42), and a valve stroke limiter (74), which valve stroke limiter limits an opening stroke of the valve closing body (42) of the inlet check valve (38) to a predetermined length, which valve stroke limiter slaves the valve closing body (42) of the inlet check valve (38) to the piston (20) during the return stroke of the piston (20), the valve closing body having been lifted from a valve seat (40) of the inlet check valve (38) by the predetermined length during the onset of the opening stroke.

2. The piston pump of claim 1, wherein the inlet check valve (38) is a spring-loaded check valve.

3. The piston pump of claim 2, wherein a valve closing spring (44) of the inlet check valve (38) is mounted on the piston (20).

4. The piston pump of claim 1, wherein the valve closing body (42) of the inlet check valve (38), before reaching one end of the supply stroke of the piston (20), enters into a force-releasable engagement with the valve opening device (56, 62), in which a force exerted on the valve closing body (42) by the valve opening device (56, 62) is so great that this force opens the inlet check valve (38) at the onset of the return stroke of the piston (20).

5. The piston pump of claim 4, wherein the valve stroke limiter (74) forces the valve opening device (56, 62) out of engagement during the return stroke of the piston (20), once the valve closing body (42) of the inlet check valve (38), in force-releasable engagement with the valve opening device (56, 62), has been lifted by the predetermined length of the opening stroke from the valve seat (40) of the inlet check valve by the return stroke of the piston (20).

6. The piston pump of claim 1, wherein the valve opening device (56, 62) of the inlet check valve (38) is in frictional engagement during the entire piston stroke, and a frictional force exerted by the valve opening device (56, 62) on the valve closing body (42) is so great that it opens the inlet check valve (38) at the onset of the return stroke of the piston (20).

7. The piston pump of claim 1, wherein the valve opening device (56, 62) operates entirely by friction.

8. The piston pump of claim 1, wherein the piston (20) has a stepped portion.

9. The piston pump of claim 1, wherein the valve opening device (56, 62) is a groove engaging a ridge.

10. A piston pump (10), having a piston (20) which is axially displaceably received in a pump housing (16) and which can be driven to execute a reciprocating stroke motion that includes a supply stroke and a return stroke, and having an inlet check valve (38) which is mounted on the piston (20), wherein the piston pump (10) has a valve opening device (56, 62), which opens the inlet check valve (38) at the onset of the return stroke of the piston (20), and that the inlet check valve (38) has a valve closing body (42), and means (74), which slaves the valve closing body (42) of the inlet check valve (38) to the piston (20) during the return stroke of the piston (20), the valve closing body having been lifted from a valve seat (40) of the inlet check valve (38) during the onset of the opening stroke.

* * * * *